United States Patent
Shieh et al.

(10) Patent No.: US 10,073,990 B1
(45) Date of Patent: Sep. 11, 2018

(54) SYSTEM AND METHOD FOR MONITORING NETWORK DEVICES INCORPORATING AUTHENTICATION CAPABLE POWER SUPPLY MODULES

(71) Applicant: Maxim Integrated Products, Inc., San Jose, CA (US)

(72) Inventors: Sui Shieh, Los Altos, CA (US); Suhel Dhanani, San Jose, CA (US); Scott Jones, Highland Village, TX (US); Anil Telikepalli, San Jose, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 0 days.

(21) Appl. No.: 14/672,646

(22) Filed: Mar. 30, 2015

Related U.S. Application Data (60) Provisional application No. 62/048,609, filed on Sep. 10, 2014.

(51) Int. Cl.
  *G06F 1/26* (2006.01)
  *G06F 21/81* (2013.01)
  *G06F 1/28* (2006.01)

(52) U.S. Cl.
  CPC .............. *G06F 21/81* (2013.01); *G06F 1/28* (2013.01)

(58) Field of Classification Search
  CPC .............................. G06F 21/70; G06F 21/81
  USPC ....................................................... 726/84, 34
  See application file for complete search history.

(56) References Cited

U.S. PATENT DOCUMENTS

| | | | |
|---|---|---|---|
| 2006/0044756 A1* | 3/2006 | Wong | G06F 1/20 361/695 |
| 2006/0091207 A1* | 5/2006 | Chang | G06Q 10/087 235/385 |
| 2007/0089163 A1* | 4/2007 | Denton | H04L 63/0428 726/2 |
| 2007/0226497 A1* | 9/2007 | Taylor | G06F 21/31 713/168 |

(Continued)

OTHER PUBLICATIONS

Goetz, System on Chip Design Methodology Applied to System in Package Architecture, 2002 Electronic Components and Technology Conference, IEEE, pp. 254-258.*

(Continued)

*Primary Examiner* — Peter C Shaw (57) ABSTRACT

A power supply module implemented within a first device and including a voltage regulator and an authentication module. The voltage regulator receives power from a power source and supplies the power to devices within the first device. The power source is separate from the power supply module. The authentication module includes a regulator module and a generation module. The regulator module controls operation of the voltage regulator based on operation in one of multiple operating modes. The generation module: receives an authentication request signal from a host device; in response to the authentication request signal, transmits an authentication response signal to the host device; and receives a notification signal from the host device based on the authentication response signal. The notification signal indicates whether the power supply module is an authorized device. The regulator module is configured to transition between the operating modes based on the notification signal.

33 Claims, 7 Drawing Sheets

(56) References Cited

U.S. PATENT DOCUMENTS

| | | | | |
|---|---|---|---|---|
| 2009/0326840 A1* | 12/2009 | Gebara | ............... | G11C 29/50 |
| | | | | 702/57 |
| 2010/0250988 A1* | 9/2010 | Okuda | ............... | G09G 5/006 |
| | | | | 713/323 |
| 2010/0293598 A1* | 11/2010 | Collart | ............ | G06F 17/30056 |
| | | | | 726/3 |
| 2011/0131455 A1* | 6/2011 | Law | ............ | H04B 3/548 |
| | | | | 714/40 |
| 2012/0284514 A1* | 11/2012 | Lambert | ............ | H04L 9/3263 |
| | | | | 713/168 |
| 2013/0207783 A1* | 8/2013 | Cruzado | ............ | H05K 5/0208 |
| | | | | 340/10.5 |
| 2014/0167931 A1* | 6/2014 | Lee | ............ | G08C 17/02 |
| | | | | 340/12.5 |
| 2014/0241247 A1* | 8/2014 | Kempf | ............ | H04L 12/4633 |
| | | | | 370/328 |
| 2015/0048684 A1* | 2/2015 | Rooyakkers | ......... | H04L 9/3263 |
| | | | | 307/65 |
| 2015/0346792 A1* | 12/2015 | Rathi | .............. | G06F 1/266 |
| | | | | 713/310 |

OTHER PUBLICATIONS

U.S. Appl. No. 14/223,735, filed Mar. 24, 2014, Haija et al.

\* cited by examiner

SYSTEM AND METHOD FOR MONITORING NETWORK DEVICES INCORPORATING AUTHENTICATION CAPABLE POWER SUPPLY MODULES

CROSS-REFERENCE TO RELATED APPLICATIONS

This application claims the benefit of U.S. Provisional Application No. 62/048,609, filed on Sep. 10, 2014. The entire disclosure of the application referenced above is incorporated herein by reference.

FIELD

The present disclosure relates to authentication of network devices monitored by a host device.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A system may include a host device (such as a programmable logic controller) and one or more input/output (I/O) devices (such as a sensor, a camera, and/or other I/O device). The host device receives data from the I/O devices via wired or wireless connections and performs an operation based on the data that is received. For example only, the system may be an automotive system, a data collection system, or a manufacturing system. In one example, the automotive system includes an engine controller (or host device) and multiple sensors that monitor operating parameters of a vehicle. The sensors transmit data to the engine controller wirelessly and/or via a controller area network (CAN). The engine controller can control actuators in the vehicle based on the data received from the sensors.

In another example, the data collection system may include a server (or host device) and a camera located remotely from the server. The camera transmits video data to the server via a wireless network. The server then categorizes and stores the data.

In another example, the manufacturing system may include a programmable logic controller (PLC) (or host device) that receives data from one or more network devices (or sensors) that include one or more sensing elements. The network devices may sense operating parameters of a manufacturing line. The network devices transmit data via wired connections and/or a wireless network (such as a wireless local area network) to the PLC. The PLC controls a process implemented by the manufacturing line based on the data that is received.

SUMMARY

A power supply module is provided and is configured to be implemented within a first device. The power supply module includes a voltage regulator and an authentication module. The voltage regulator is configured to (i) receive power from a power source, and (ii) supply the power to multiple devices within the first device, wherein the power source is separate from the power supply module. The authentication module includes a regulator module and a generation module. The regulator module is configured to control operation of the voltage regulator based on operation in one of multiple operating modes. The generation module is configured to (i) receive an authentication request signal from a host device, (ii) in response to the authentication request signal, transmit an authentication response signal to the host device, and (iii) receive a notification signal from the host device based on the authentication response signal, wherein the notification signal indicates whether the power supply module is an authorized device. The host device is separate from the first device. The regulator module is configured to transition between the operating modes based on the notification signal.

In other features,

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A system may include a host (or master) device that receives data from one or more network (or slave) devices each including a wired or wireless communication interface. The host device is often susceptible to receiving data from unauthorized network devices and/or one or more unauthorized system-on-chips (SoCs) of the network devices. As an example, the unauthorized SoCs may be counterfeit SoCs and/or clones of authorized SoCs. In many cases, the network devices are at locations remote from the host device, which increases ease in unauthorized replacement of the network devices with counterfeit and/or clone devices. If a network device and/or a SoC of the network device is unauthorized and begins to transmit false data to the host device, the host device may rely on the false data, which may adversely affect operation of at least a portion of a plant or factory system.

Network devices are disclosed herein that each include a power supply module. Each of the power supply modules has a power regulator with an integrated authentication module. Each of the power regulators supplies and regulates power to components in a corresponding one of the network devices. The integrated authentication modules are used to authenticate the power control modules, other control modules of the network devices, and/or the network devices. The power supply modules may each be a chip with an integrated authentication module that generates and/or stores a unique signature and/or key. The unique signature and/or key may be generated by, embedded within, and/or stored in the power supply modules and/or authentication modules.

Subsequent to being powered up, the network devices may be authenticated based on communication between the authentication modules and the host device. The power supply modules may send a digital signature and/or authentication code to the host device. The host device receives and verifies that the digital signature and/or authentication code is valid via, for example, symmetric and asymmetric cryptographic algorithms. If a digital signature and/or authentication code is not provided by a network device to a host device and/or a received digital signature and/or authentication code is not valid, then the network device is flagged as non-authenticated by the host device. As an alternative the power module can shut off the network device if the digital signature is not validated.

Figure 1:
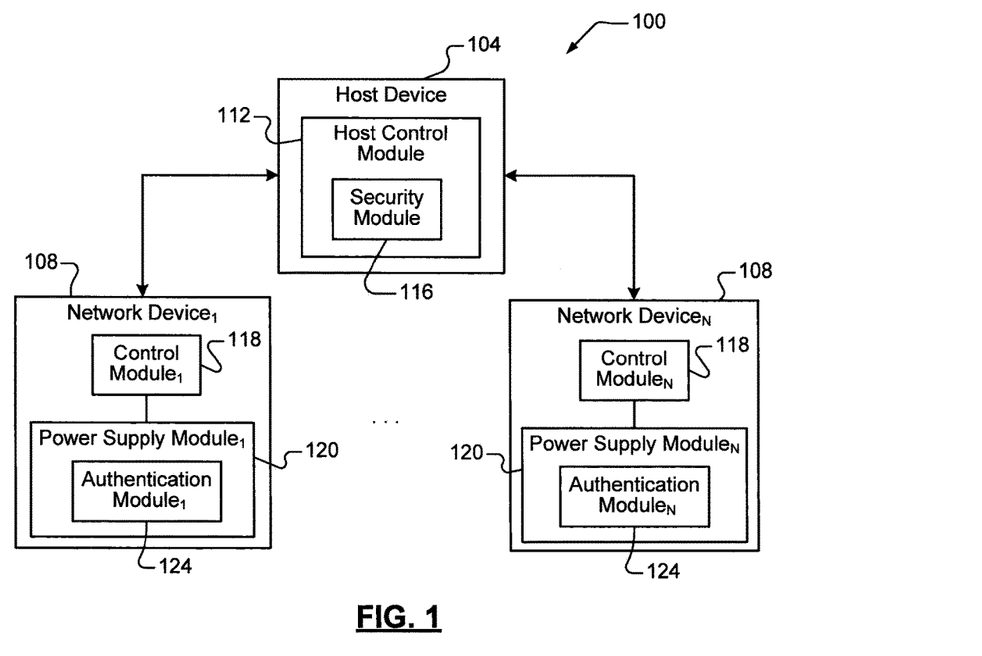
FIG. 1 is a functional block diagram of a system including a host device and network devices according to the present disclosure.

Referring now to FIG. 1, an example of a system 100 is shown. The system 100 includes a host (or master) device 104 and multiple network (slave) devices 108. While two network devices are shown in FIG. 1, the system 100 may include any number of network devices. The host device 104 monitors and determines validity of the network devices 108 and/or corresponding SoCs of the network devices 108. This may be performed via software and/or hardware in the host device 104 or in another central monitoring device and/or mode separate from the host device 104. The host device 104 may be a central or main monitoring device of a manufacturer and/or supplier of the network devices. As another example, the host device may be a central monitoring device of a plant or factory system.

The host device 104 includes a host control module 112 with a security module 116. The security module 116 may be separate from the host device 104 and/or may be implemented as software executed by the host control module 112. The host device 104 exchanges data with the network devices 108. Based on the data received, the host device 104 may, for example, monitor and/or control operation of the system 100. For example, as part of a manufacturing line, the host device 104 may control the operation of one or more actuators, robots, or other devices based on the information received from the network devices 108. The host device 104 may, for example: modify movement of the actuators or the robots; control a processing speed of the manufacturing line; and/or store and collect data relating to the performance of the manufacturing line. The host device 104 sends commands to and/or monitors data from the network devices 108. The data may include performance characteristics of the network devices 108, network device settings, hardware configurations, measured parameters internal and/or external to the network devices (or sensor data), diagnostic data, and/or identification information of the network devices 108. The identification information may include identifiers, manufacturer model numbers and/or technical descriptions of the network devices 108.

The network devices 108 may be adjacent and/or proximate to the host device 104 or may be located remotely from the host device 104 in, for example, a different building than the host device 104. Each of the network devices 108 has a unique address and may be, for example a sensor, a computer, a printer, an actuator, a radio-frequency identification (RFID) reader, and/or other suitable device that exchanges data with the host device 104. The network devices 108 include respective control modules 118 and power supply modules 120, which include respective authentication modules 124. The authentication modules 124 are integrated in the same respective packages (or chips) as the power supply modules 120. The control modules 118 receive power from the power supply modules 120. The authentication modules 124 exchange security information with the host control module 112. The power supply modules 120 provide power to the control modules 118 and other devices of the network devices 108 based on the exchange of the security information. The security information may include, for example, a password, encrypted information, one or more keys, a device identifier, and/or other suitable information for verifying the authenticity of the network device and/or corresponding power supply module.

As an example, the authentication of one of the network devices 108 may be initiated by the host device 104. The host device 104 may send to the network device a request signal (sometimes referred to as a "challenge"). The request signal may include a set of bits. The power supply module of the network device generates a digital signature based on the set of bits and sends the digital signature to the host device 104. At this point, the host device 104 determines if the network device is an authentic device or a clone. Actions may then be taken if the network device is determined to be a fake. This may include the host device 104 or other central monitoring device flagging the network device as unauthorized and/or not authentic. The flag (e.g., bit stored in memory of the host device 104) and/or the response from the network device may be indicated via the host device to a system operator and/or vendor.

When determining whether to perform a countermeasure, the host device 104 may ignore values that are not authentic or values that are provided from an unauthorized network device. The host device 104 may indicate to a system operator and/or a central monitoring device why the values are not authentic (e.g., too high or too low). As an example of a countermeasure, the host device 104 may instruct the network device to shut down (or power OFF) and/or transition to a sleep mode. These and various other embodiments are described in more detail below.

Figure 2:
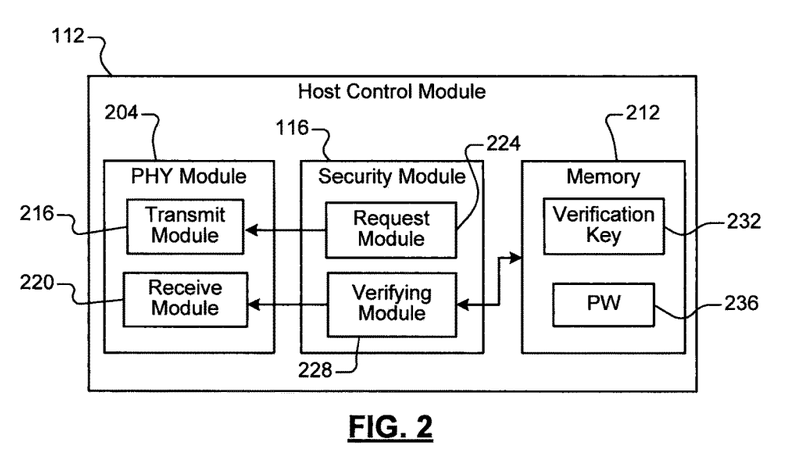
FIG. 2 is a functional block diagram of a host control module according to the present disclosure.

Referring now to FIG. 2, an example of the host control module 112 is shown. The host control module 112 includes a physical layer (PHY) module 204, the security module 116, and memory 212. The PHY module 204 includes a transmit module 216 and a receive module 220. The transmit module 216 and the receive module 220 may include and/or be implemented respectively as a transmitter and a receiver. The PHY module 204 may transmit signals to and receive signals from the network devices (e.g., the network devices 108 of FIG. 1) via a wired and/or wireless network. For example, the PHY module 204 may exchange data via a local interconnect network (LIN), a satellite network, a terrestrial wireless network, a wireless local area network (e.g., a Wi-Fi network), a network established under highway addressable remote transducer (HART) protocol, and/or other suitable wired and/or wireless networks.

The security module 116 verifies authenticity of network devices. The security module 116 may determine whether the network devices are authorized to communicate with the host device 104. The security module 116 performs an authentication protocol to verify that the network devices and/or chips of the network devices (e.g., the modules 118, 120 of FIG. 1) are authorized. As an example, the security module 116 may transmit an authentication request to a network device and then analyze a response received from the network device. If the received response matches a reference response generated by the security module 116, then the network device and/or chip is an authorized (or valid) device. If the received response does not match the reference response, then the network device and/or chip is an unauthorized device. The security module 116 may transmit the authentication request at, for example, a preset interval. The authentication request may be initially transmitted to the network device in response to receiving data (e.g., sensor data) from the network device.

The authentication protocol may be a non-cryptographic protocol, such as a password authentication protocol and include the host device 104 sending a request for a password. The network device responds to the request from the host device 104 by transmitting a password to the host device 104. The password may be generated by the corresponding authentication module (e.g., one of the authentication modules 124 of FIG. 1) of the network device. Alternatively, the authentication protocol may be a cryptographic protocol and include an elliptic curve digital signature algorithm (ECDSA), a secure hash algorithm (SHA), and/or other suitable cryptographic algorithm. If a cryptographic protocol is used, the host device 104 may transmit supplementary information, which is randomly generated, to a network device. The network device may then encrypt the supplementary information received from the host device 104 and/or other information, such as a private key and/or a device identifier, based on a cryptographic algorithm. The encryption may be performed by the authentication module. The encrypted information may then be transmitted to and verified by the host device 104 prior to authorizing the network device.

The authentication protocol utilized by the host device 104 may also be utilized by the network device and/or power supply module of the network device (hereinafter referred to collectively as the network device). For example, if the non-cryptographic protocol is used, then the host device 104 and the network device store a same password. In another example, if a cryptographic protocol is utilized, then the host device 104 and the network device include correlating cryptographic algorithms for encrypting and decrypting data. For example, the host device 104 may include a first set of cryptographic algorithms for decrypting a response received from the network device and for generating a reference response. The network device may include a second set of cryptographic algorithms for generating the response sent to the host device 104.

The memory 212 stores predefined data used by the security module 116 to verify the authenticity of the network device 108. For example, the memory 212 may store a verification key 232 and/or a password (PW) 236. The verification key 232 may be a public key, which is associated with a private key stored at a network device, as described below. The password 236 may be predefined and stored in the network device.

The authentication protocol may be implemented by a request module 224 and a verifying module 228. The request module 224 generates and transmits an authorization request to the network device via the transmit module 216. The authorization request may, for example, request an identification (ID) pin, such as a password that is stored in the network device. Alternatively, the authorization request may include supplementary information that is randomly generated by the request module 224. The authentication request requests the network device to generate an encrypted response based on the supplementary information.

The verifying module 228 receives the response to the authorization request from the network device via the receive module 220. The verifying module 228 analyzes the received response to determine if the received response correlates with the reference response (e.g., the received response matches more than a predetermined number of bits of the reference response). As an example, the verifying module 228 may use the password stored in the memory 212 as the reference response, and determine if the received response matches the password stored in the memory 212. If the received response does not include the same password, the verifying module 228 may flag the network device as an unauthorized device. If the received response includes the same password, then the verifying module 228 flags the network device as an authorized device. The verifying module 228 may store data in the memory 212 that identifies the network device as an authorized or unauthorized device.

As another example, the verifying module 228 generates a reference response to the authorization request based on: the cryptographic algorithm; the supplementary information transmitted in the authorization request; and/or the verification key 232 stored in the memory 212. If the received response matches the reference response, the network device is flagged as an authorized device. If the received response does not match the reference response, then the network device is flagged as an unauthorized device.

Subsequent to the security module 116 determining that the network device is an authorized device, the host device 104 may exchange data with the network device via the PHY module 204. If the network device is identified as an unauthorized device, the security module 116 may perform a countermeasure. This may include, for example, preventing further communication with the network device. The security module 116 may also (i) transmit a notification signal to the network device indicating that the response received from the network device is invalid, and/or (ii) generate an alert message indicating that the network device is unauthorized. The alert message may be provided to a user of the host device 104 and/or may instruct the network device to generate a corresponding alert message for a user of the network device.

Figure 3:
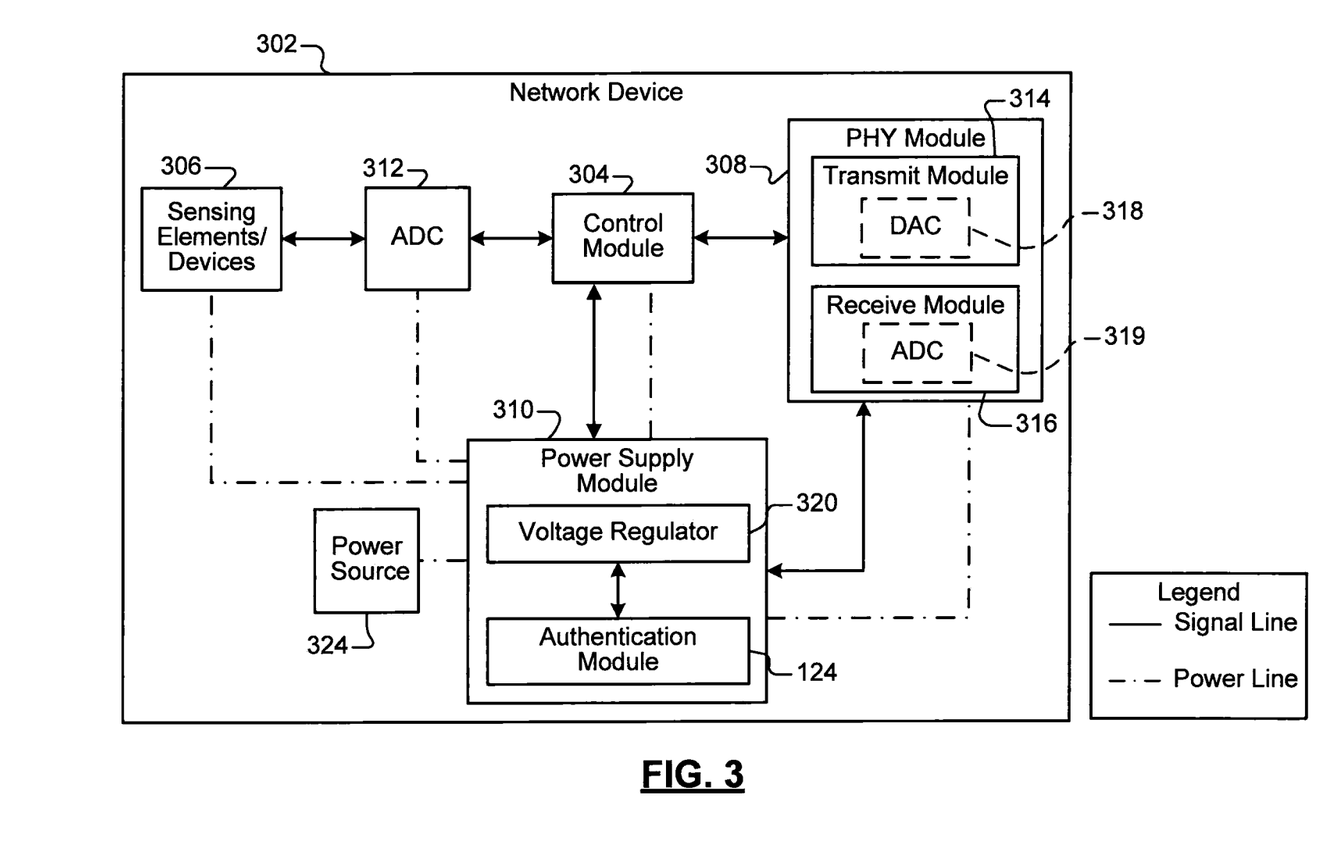
FIG. 3 is a functional block diagram of a network device according to the present disclosure.

Referring now to FIG. 3, a network device 302 is shown. The network device 302 may replace any one of the network devices 108 of FIG. 1. The network device 302 includes a control module 304, a PHY module 308, and a power supply module 310. The network device 302 may operate as a sensor and include one or more sensing elements and/or devices 306 (e.g., temperature sensing elements, an accelerometer, electrodes, a gyroscope, a carbon dioxide sensing device, a pressure sensing element, a colorimeter, and/or other sensing elements and/or devices. Although not shown, the control module 304 may include some or all of the sensing elements and/or devices 306. In one embodiment, the sensing elements and/or devices 306 are separate from the network device 302 and provide analog signals to the network device 302. The control module 304 may receive information from the sensing elements and/or devices 306 via an analog-to-digital converter (ADC) 312. The control module 304 may control and/or monitor the sensing elements and/or devices 306.

The PHY module 308 includes a transmit module 314 and a receive module 316. The transmit module 314 and the receive module 316 may include and/or be implemented as a transmitter and a receiver, respectively. The PHY module 308 may transmit signals to and receive signals from a host device (e.g., the host device 104 of FIG. 1) via a wired network and/or a wireless network. The transmit module 314 may include a digital-to-analog converter (DAC) 318 for converting a digital signal from the control module 304 and/or the power supply module 310 to an analog signal, which is transmitted to the host device. The receive module 316 may include an ADC 319 for converting an analog signal from the host device to a digital signal which is provided to the control module 304 and/or the power supply module 310. Alternatively, the PHY module 308 may transmit digital signals to and receive digital signals from the host device. Accordingly, the transmit module 314 and the receive module 316 may not include the DAC 318 and the ADC 319, respectively.

The control module 304 may transfer signals between the power supply module 310 and the physical layer module 308 or the signals may be transferred directly between the power supply module 310 and the physical layer module 308. The control module 304 may transfer parameters associated with the sensing elements 306 to the host control module 112 based on the operating mode and/or signals received from the authentication module 124. The control module 304 may control operation of the power supply module 310 and/or the voltage regulator 320. For example, while in a standby mode and/or an OFF-mode, the control module 304 may not transmit the parameters to the host control module 112. As another example, the control module 304 may have limited communication capabilities and/or may be prevented from communicating with the host control module 112 based on a control signal received from the authentication module 124. The control signal may be generated based on whether the authentication module is deemed to be authorized by the security module 116.

The power supply module 310 includes a voltage regulator 320 and the authentication module 124. The power supply module 310 may be a stand-alone SoC separate from the control module 304, which may be a second SoC.

The power supply module 310 supplies power to the control module 304, the PHY module 308, and/or other components of the network device 302 via the voltage regulator 320. The voltage regulator 320 receives power from an alternating current (AC) or a direct current (DC) power source 324 (e.g., an AC outlet or a battery). While the power source 324 is shown as being included in the network device 302, the power source 324 may be external to the network device 302, such as an AC power supply connected to the network device 302 via an AC plug and socket.

The power supply module 310 may operate the network device 302 in an OFF-mode, an ON-mode, or a sleep-mode. In the OFF-mode, the power supply module 310 does not supply power to circuit devices (e.g., the control module 304, the PHY module 308, the sensing elements/devices 306, and/or the ADC 312) of the network device 302. The network device 302 may be transitioned manually from the OFF-mode to the ON-mode or the sleep mode by a user via a power switch. In addition or alternatively, the network device 302 may transition to the ON-mode or the sleep mode based on signals from the sensing elements and/or devices 306 and/or a signal received from the host device. In the ON-mode, the power supply module 310 supplies power to circuit devices of the network device 302, such as the control module 304, the PHY module 308, the sensing elements/devices 306, and/or the ADC 312.

In the sleep-mode, the power supply module 310 may power selected circuit devices of the network device 302. For example, the power supply module 310 may supply power to the PHY module 308. When the PHY module 308 receives an activation signal from the host device 104, the PHY module 308 provides the activation signal to the power supply module 310. The power supply module 310 may then turn ON the remaining components of the network device 302, such as the control module 304, the sensing elements/devices 306, and/or the ADC 312. Alternatively, if the PHY module 308 receives an authentication request from the host device 104, the power supply module 310 may not supply power to the other components until the network device 302 is authorized to communicate with the host device 104.

The power supply module 310 is shown as sharing the PHY module 308 with the control module 304. Alternatively, the network device 302 may have multiple PHY modules, where each of the PHY modules is allocated respectively to the control module 304 and the power supply module 310. Portions or all of the one or more PHY modules may be shared by and/or included in the control module 304 and/or the power supply module 310.

The authentication module 124 generates security information in response to an authorization request received from the host device. That is, the power supply module 310 may receive the authentication request from the host device via the receive module 316. The authentication module 124 generates a response to the authentication request, which is transmitted to the host device via the transmit module 314.

Figure 4:
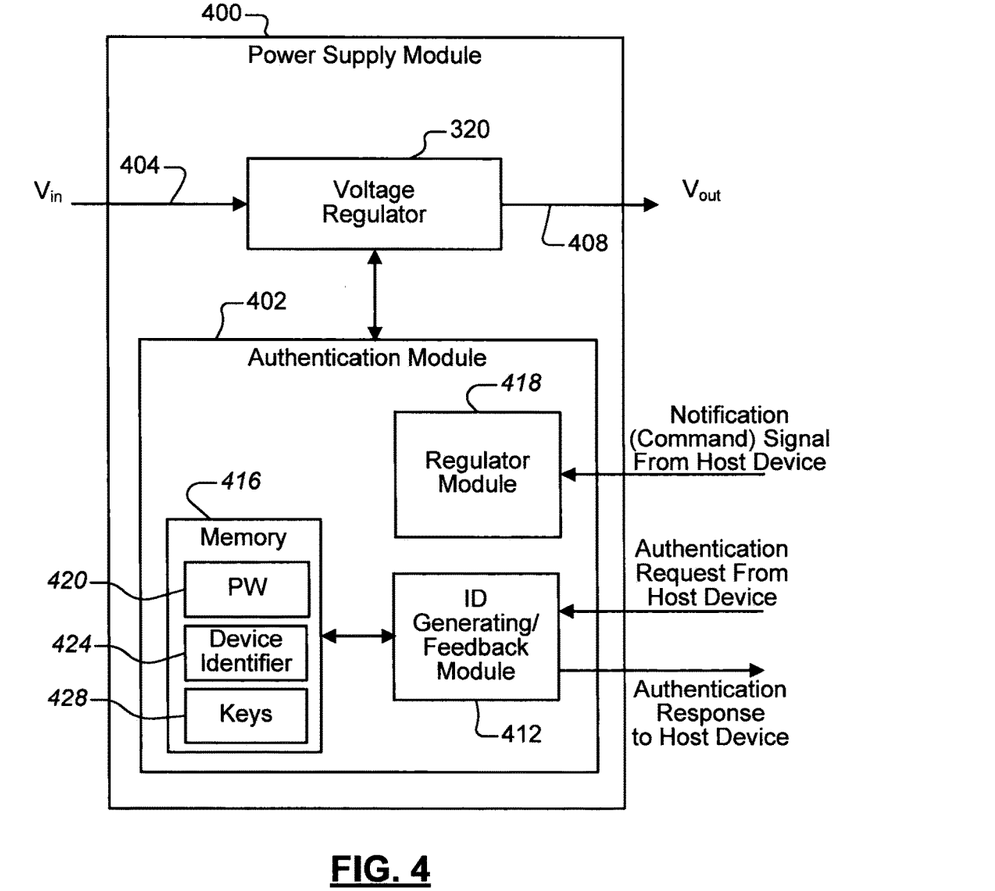
FIG. 4 is a functional block diagram of a power supply module according to the present disclosure.

With reference to FIG. 4, a power supply module 400 is shown. The power supply module 400 may replace the power supply module 120 of FIG. 1 and/or the power supply module 310 of FIG. 3. The power supply module 400 includes the voltage regulator 320 and an authentication module 402. The authentication module 402 may operate similar to and/or replace the authentication module 124. The voltage regulator 320 may receive an input voltage 404 from the power source 324 and may generate an output voltage 408 to power the circuit devices of the network device (e.g., the network device 302 of FIG. 3). The voltage regulator 320 may be a low-drop regulator (LDO), a DC-to-DC switch-mode regulator, or other suitable power regulator. The voltage regulator 320 may include a buck converter, a boost converter, and/or a DC-to-DC converter.

The authentication module 402 includes an identification (ID) generating (and/or feedback) module 412, memory 416, and a regulator module 418. The ID generating module 412 receives an authorization request from a host device (e.g., the host device 104 of FIG. 1) via the PHY module, and generates an authentication response (hereinafter referred to as "the response") to the authorization request. The response is then transmitted to the host device via the PHY module.

The memory 416 stores information (i.e., credentials) used by the ID generating module 412 to generate the response. The authentication information may include a password (PW) 420, a device identifier 424, and/or one or more keys 428. The password 420 may be the same password stored by the host device. The device identifier 424 may be: a ROM identifier (ID) of the memory 416; an ID of a control module (the control module 304 of FIG. 3); an ID of the power supply module 310; and/or other suitable information unique to the corresponding network device (e.g., the network device 302) and/or the power supply module 310. The keys 428 may include a private key that corresponds to a public key stored in the host device.

The response generated by the ID generating module 412 includes information that is used by the host device 104 to identify the network device as an authorized or unauthorized device. For example, if the authentication request requests for a password, the ID generating module 412 may generate a response that includes the password stored in the memory 416 and the device identifier 424. Alternatively, if the authentication request includes supplementary information which is to be encrypted, the ID generating module 412 may generate a digital signature unique to the network device as the response to the authentication request. The digital signature may be generated using, for example: the supplementary information; the device identifier 424; and the keys 428 stored in the memory 416. The ID generating module 412 may use a first cryptographic algorithm that correlates with a second cryptographic algorithm used by a security module (e.g., security module 116 of FIG. 2) of the host device to encrypt: the supplementary information; the key 428; and the device identifier 424 to generate the digital signature. Resulting encrypted data may be provided as the response to the host device 104.

The regulator module 418 may control the voltage regular 320 based on an operating mode (e.g., OFF-mode, ON-mode, or sleep-mode) of the power supply module 400. After transmitting the response to the host device, the power supply module 400 may refrain from transitioning to a different operating mode until a response is received from the host device. For example, if the power supply module 400 is in the ON-mode, the regulator module 418 continues to provide power to the network device via the voltage regulator 320. If the regulator module 418 receives a notification (command) signal from the host device identifying the network device as an unauthorized device, the regulator module 418 may then transition the power supply module 400 to a sleep-mode or an OFF mode via the voltage regulator 320.

In another example, if the power supply module 400 is in the sleep-mode, the regulator module 418 may continue to provide power to selected circuit devices of the network device such as the PHY module 308. If the regulator module 418 receives a notification signal from the host device identifying the network device as an unauthorized device, the regulator module 418 may continue to operate the power supply module 400 in the sleep-mode. Alternatively, if the regulator module 418 receives a notification signal from the host device identifying the network device as an authorized device, the regulator module 418 may transition the power supply module 400 to the ON-mode and turn ON portions of the network device that are not already ON.

Figure 5:
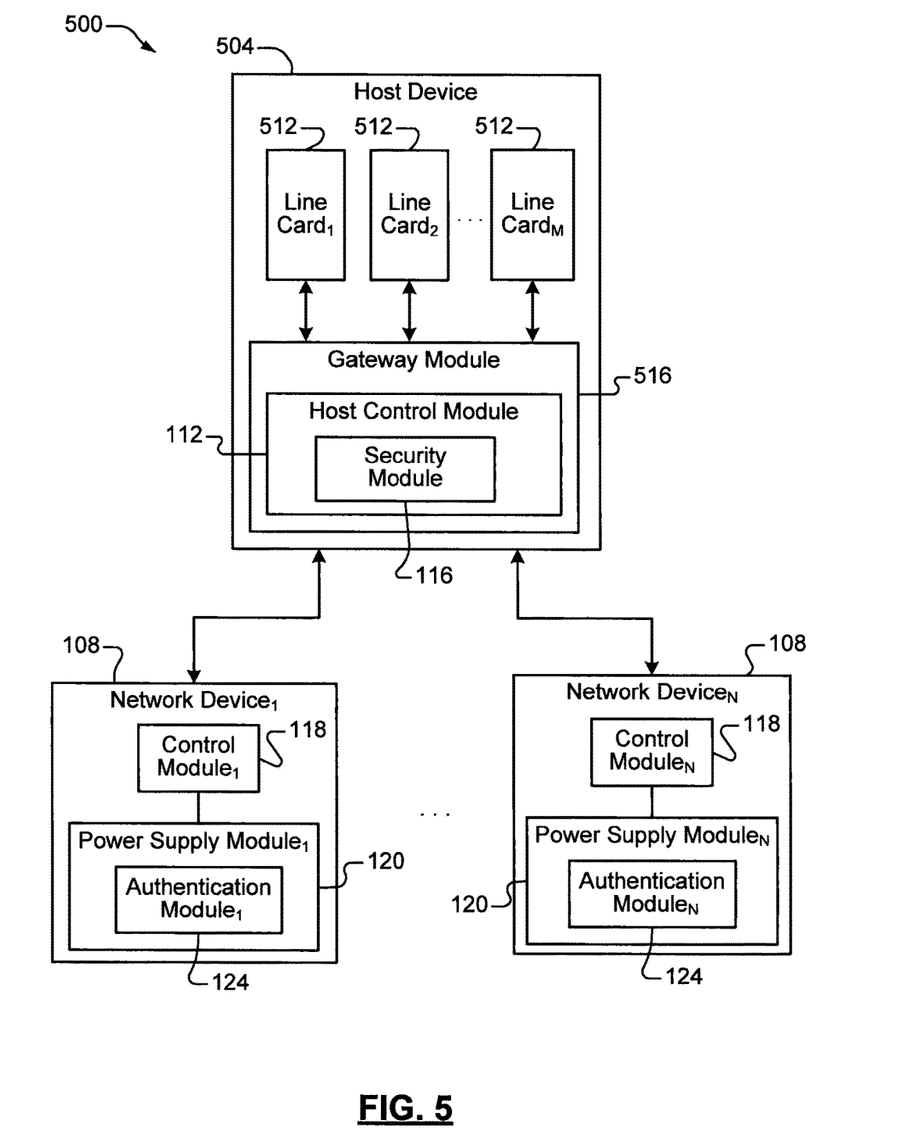
FIG. 5 is a functional block diagram of a system including a gateway module and network devices according to the present disclosure.

Referring now to FIG. 5, another system 500 is shown. The system 500 includes the network devices 108 and a host device 504. The network devices 108 include the control modules 118, the power supply modules 120, and the authentication modules 124. The host device 504 includes one or more line cards 512 and a gateway module 516, which may be mounted in a chassis. The line cards 512 transmit signals to and receive signals from the network devices 108 via the gateway module 516. As an example, the line cards 512 may receive sensor information from the network devices 108.

The gateway module 516 routes signals from the line cards 512 to the network devices 108 and vice versa. The gateway module 516 may include the host control module 112 with the security module 116. The host control module 112 verifies the authenticity of the network devices 108 based on an authentication protocol. If a network device is determined to be unauthorized, the gateway module 516 and/or the host control module 112 may perform countermeasures (some of which are disclosed above). As another example countermeasure, the gateway module 516 and/or the host control module 112 may not transmit signals between the line cards 512 and the network device. If a network device is determined to be authorized, the gateway module 516 and/or the host control module 112 permits communication with the network device.

Figure 6:
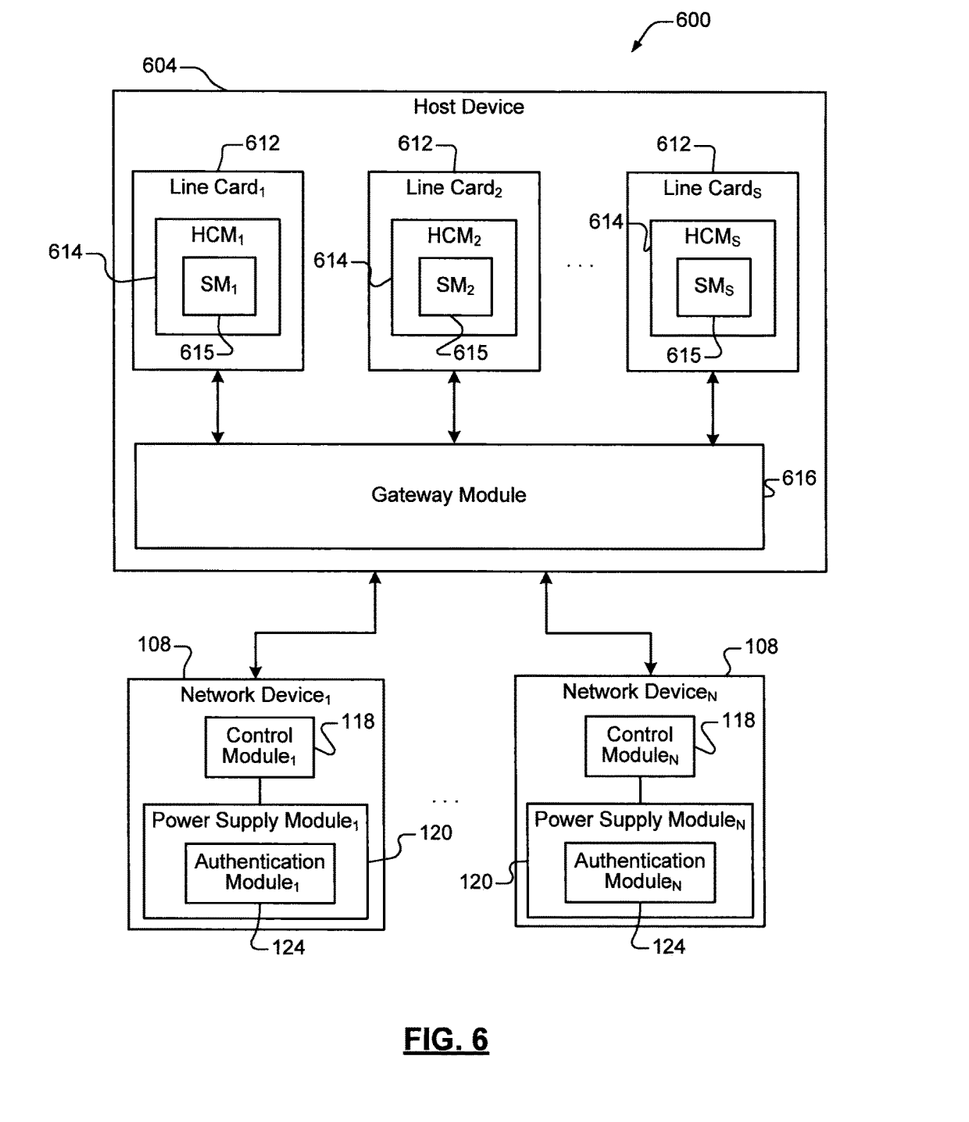
FIG. 6 is a functional block diagram of a system including a line cards and network devices according to the present disclosure.

Referring now to FIG. 6, another system 600 is shown. The system 600 includes the network devices 108 and a host device 604. The network devices 108 include the control modules 118, the power supply modules 120, and the authentication modules 124. The host device 604 includes one or more line cards 612 and a gateway module 616, which may be mounted in a chassis. The gateway module 616 routes signals between the line cards 612 and the network devices 108.

Each of the line cards 612 may include host control modules 614 with security modules 615. Each of the host control modules 614 may operate similar to and/or be replaced by the host control module 112 of FIG. 2. Each of the security modules 615 may operate similar to and/or be replaced by the security module 116 of FIG. 2. The host control modules 614 verify whether the network devices 108, as described above with respect to the host control module 112 and security module 116. Each of the security modules 615 may determine whether some or all of the network devices 108, power supply modules 120, and/or authentication modules 124 are authorized devices or unauthorized devices. The security modules 615 may be assigned to a respective one or more of the network devices 108. The security modules (e.g., the security modules 116, 615), based on the authorizing determinations disclosed herein, authorize the network devices disclosed herein and/or the modules of the network devices disclosed herein to: operate in certain modes; and/or limit and/or prevent communication with one of the host control modules disclosed herein.

Figure 7:
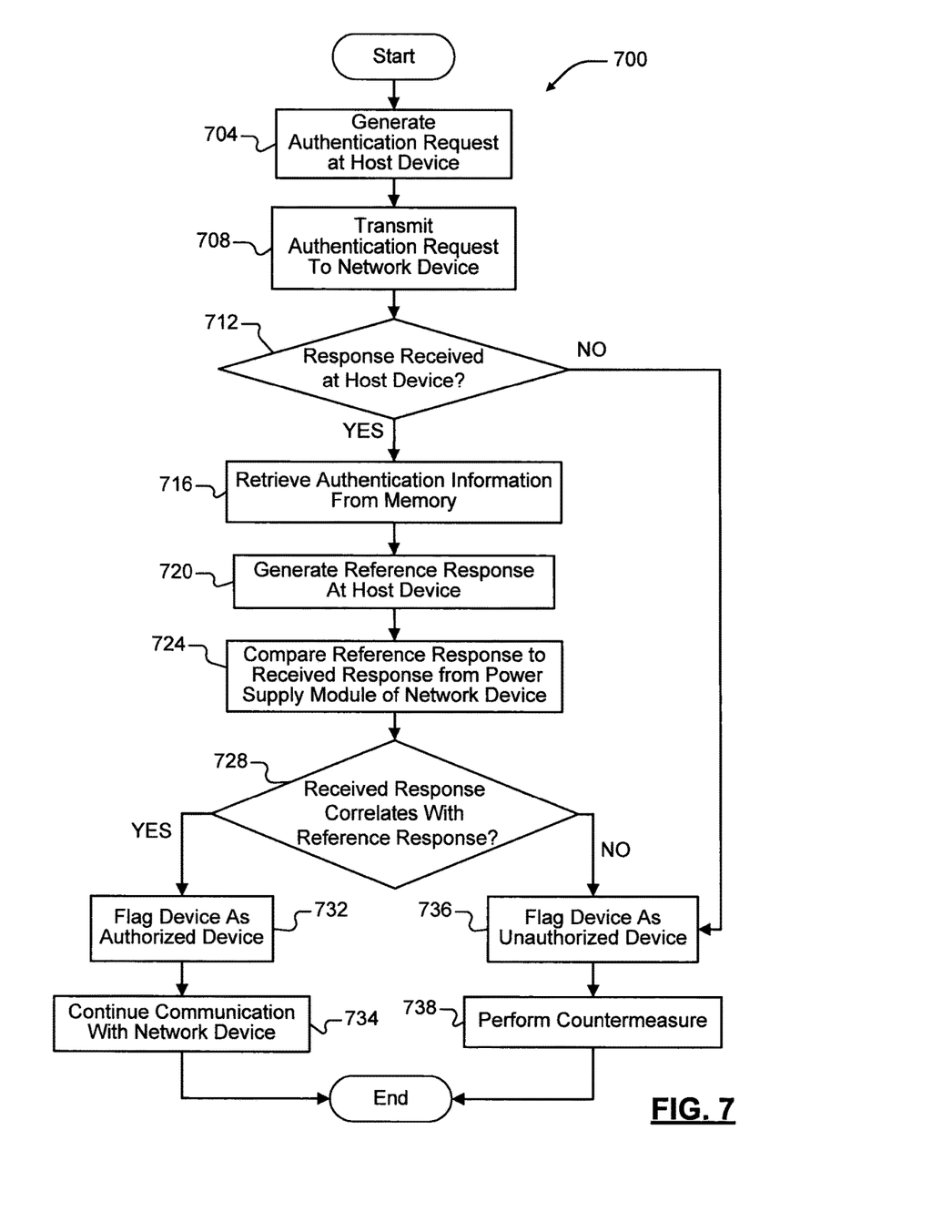
FIG. 7 illustrates an authorization method according to the present disclosure.

Referring now to FIG. 7, an example authorization method 700 is shown. Although the method is primarily described with respect to the examples shown in FIGS. 1-6, the tasks of the method may be applied to other examples of the present disclosure. The tasks may be iteratively performed.

The method 700 includes determining whether a network device (e.g., one of the network devices 108, 302) is authorized to communicate with a host device (e.g., one of the host devices 104, 504, 604). At 704, the security module 116 generates an authorization request. For example, the authorization request may request the network device to provide a password that is stored in the host device and in the network device. Alternatively, the authorization request may include supplementary information that is randomly generated. The authentication request may request the network device to generate an encrypted response. At 708, the PHY module 204 transmits the authorization request to the network device.

At 712, the security module 116 determines whether a response is received from the network device. For example, the security module 116 may wait a preset time period after transmitting the authorization request before determining whether the response is received. If a response is not received, the security module 116 continues to task 736 to flag the network device as an unauthorized device. That is, if a response is not received, the security module 116 determines that the network device is an unauthorized device.

At 716, if a response is received, the security module 116 retrieves authentication information from the memory 212 for analyzing the response. For example, the security module 116 may retrieve the password 236 and/or verification key 232 stored in the memory 212. At 720, the security module 116 generates a reference response. For example, the reference response may be the password 236. In another example, the reference response may be generated using: a cryptographic algorithm; the information transmitted at 716; and the verification key 232.

At 724, the security module 116 compares the reference response to the response received from the network device. At 728, the security module 116 determines whether the received response correlates with the reference response. For example, the security module 116 may determine if the received response includes a password that matches the password provided in the reference response. Alternatively, the security module 116 may determine if the received response matches the encrypted data of the reference response.

If the received response correlates with the reference response, the security module 116 flags the network device as an authorized device at 732. For example, the security module 116 may store data in the memory 212 identifying the network device as an authorized device. Subsequently, at 734, the security module 116 and/or the host control module 112 communicates with the network device 108. For example, the host control module 112 may request the network device to transmit physical quantities detected by the sensing elements/devices 306 (e.g., temperature, acceleration, pressure, etc.) to the host control module 112. The method 700 may end subsequent to task 732. Alternatively, the host device may communicate with and/or request information from the control module (e.g., one of the control modules 118, 304) and/or the power supply module (e.g., one of the power supply modules 120, 310, 400). The requested information may be information from and/or generated as a result of outputs from the sensing elements and/or devices 306.

If the received response does not correlate with the reference response, the security module 116 flags the network device as an unauthorized device at 736. At 738, the security module 116 performs a countermeasure. For example, the method 700 may no longer transmit a command and/or a request to the unauthorized device. The security module 116 may also notify the network device that the network device is an unauthorized device and/or instruct the network device to power down or transition to a sleep mode. The method 700 may end subsequent to 738.

Figure 8:
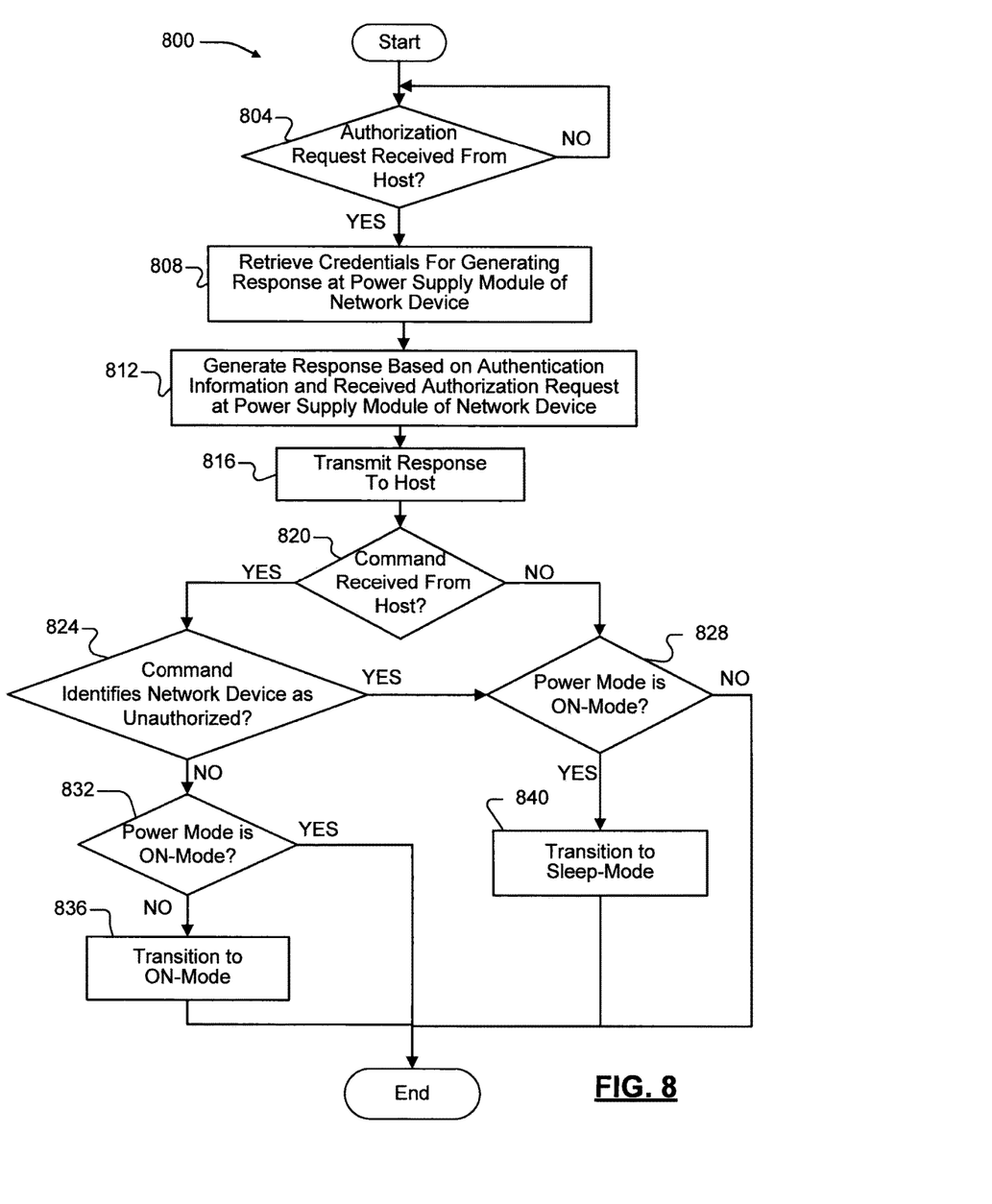
FIG. 8 illustrates an identification method according to the present disclosure.

Referring now to FIG. 8, an example identification method 800 is shown. Although the method is primarily described with respect to the examples shown in FIGS. 1-6, the tasks of the method may be applied to other examples of the present disclosure. The tasks may be iteratively performed. The method 800 includes responding to an authorization request received from the host device (e.g., one of the host devices 104, 504, 604). At 804, the PHY module 308 and/or the power supply module 400 determines whether an authorization request is received. If true, task 808 is performed.

At 808, the ID feedback module 412 of the authentication module 402 retrieves credentials of the network device 302 from the memory 416. For example, the ID feedback module 412 may retrieve the password 420, the device identifier 424 and/or the key 428 from the memory 416. At 812, the ID feedback module 412 generates a response. For example, the ID feedback module 412 may generate a response that includes the password 420 and the device identifier 424. Alternatively, the ID feedback module 412 may generate a response based on: a cryptographic algorithm; the supplementary information received at 804; the keys 428; and/or the device identifier 424. At 816, the PHY module 308 transmits the response to the host device.

At 820, the authentication module 402 determines whether a command has been received from the host device. For example, the ID feedback module 412 may wait a preset time period after transmitting the response before determining whether a command has been received. If a command has been received, task 824 is performed, otherwise task 828 is performed.

At 824, the authentication module 402 determines whether the command received from the host device identifies the network device 302 as an unauthorized device. For example, the command may include data that identifies the network device 302 as an unauthorized device. If true, task 828 is performed, otherwise task 832 is performed.

At 832, the authentication module 402 determines if the power supply module 400 is in the ON-mode. More particularly, if the network device 302 is an authorized device, the network device 302 may be transitioned to the ON-mode if not already in the ON-mode. If the network device is in the ON-mode, the method 600 may end. If the network device 302 is in the sleep mode, the authentication module 402 transitions the power supply module 400 to the ON-Mode at 836, and the method 800 may end.

At 828, the authentication module 402 determines if the power supply module 400 is in the ON-mode. This may be based on the countermeasure performed at 738 of FIG. 7 and/or based on a notification (or countermeasure) signal received from the host device. More particularly, if a command is not received at 820, the authentication module 402 determines that the network device 302 is unauthorized, and therefore, transitions the power supply module 400 to the sleep-mode if not already in the sleep mode. Accordingly, if the network device is in the ON-mode, the authentication module 402 transitions the power supply module 400 to the sleep-mode at 840 and then the method 800 ends. Alternatively, once the network device 302 is identified as an unauthorized device, the authentication module 402 may transition the power supply module 400 to the OFF-mode. If the network device 302 is in the sleep mode, the method 800 ends. During the standby mode, the authentication module 402 may generate a control signal to limit and/or prevent communication between the control module 304 and the host device and/or between the power supply module 310 and the host device. This may be based on the notification (or countermeasure) signal.

The above-described tasks of FIGS. 7-8 are meant to be illustrative examples; the tasks may be performed sequentially, synchronously, simultaneously, continuously, during overlapping time periods or in a different order depending upon the application. Also, any of the tasks may not be performed or skipped depending on the implementation and/or sequence of events.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A OR B OR C), using a non-exclusive logical OR, and should not be construed to mean "at least one of A, at least one of B, and at least one of C." It should be understood that one or more steps within a method may be executed in different order (or concurrently) without altering the principles of the present disclosure.

In this application, including the definitions below, the term 'module' or the term 'controller' may be replaced with the term 'circuit.' The term 'module' may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A power supply module to be implemented within a first device, the power supply module comprising:
   a voltage regulator configured to (i) receive power from a power source, and (ii) supply the power to a plurality of modules within the first device, wherein the power source is separate from the power supply module; and
   an authentication module comprising
      a regulator module configured to control operation of the voltage regulator based on operation in one of a plurality of operating modes, and
   a generation module configured to (i) receive an authentication request signal from a host device, (ii) in response to the authentication request signal, transmit an authentication response signal to the host device, and (iii) receive a notification signal from the host device based on the authentication response signal, wherein the authentication response signal includes at least one of a password, a first key, a device identifier, a digital signature or an identification pin, wherein the notification signal is indicative of whether the power supply module is authorized for operation in the first device based on the at least one of the password, the first key, the device identifier, the digital signature, or the identification pin,
   wherein the host device is separate from the first device, and
   wherein the regulator module is configured to transition between the plurality of operating modes based on the notification signal.

2. The power supply module of claim 1, wherein the power supply module is a system on chip.

3. The power supply module of claim 1, wherein:
   the authentication module is a system on chip;
   the power supply module is a system in package; and
   the system in package includes the voltage regulator and the authentication module.

4. The power supply module of claim 1, wherein the plurality of operating modes includes an OFF-mode, an ON-mode and a sleep-mode.

5. The power supply module of claim 1, wherein:
the authentication response signal include the password; and
the notification signal is indicative, based on the password, of whether the power supply module is an authorized module.

6. The power supply module of claim 1, wherein:
the authentication response signal includes the first key; and
the notification signal is indicative, based on the first key, of whether the power supply module is an authorized module.

7. The power supply module of claim 1, wherein:
the authentication response signal includes the device identifier;
the device identifier is of
the power supply module,
a memory in the authentication module, or
a control module in the first device; and
the notification signal is indicative, based on the identifier, of whether the power supply module is an authorized module.

8. The power supply module of claim 1, wherein:
the authentication response signal comprises the password, the identifier, and a plurality of keys, wherein the plurality of keys includes the first key;
the identifier identifies (i) the power supply module, (ii) a memory in the authentication module, or (iii) a control module in the first device; and
the notification signal is indicative, based on the password, the identifier, and the plurality of keys, of whether the power supply module is an authorized module.

9. The power supply module of claim 1, wherein the plurality of modules comprise:
a plurality of sensing devices;
an analog-to-digital converter;
a control module; and
a physical layer module,
wherein the plurality of sensing devices, the analog-to-digital converter, the control module, and the physical layer module are separate from the power supply module.

10. A network device comprising:
the power supply module of claim 1;
a physical layer module configured to (i) receive the authentication request signal from the host device, (ii) receive the authentication response signal from the power supply module, and (iii) receive the notification signal from the host device;
a sensing element configured to generate an output signal, wherein the output signal is indicative of a parameter detected by the sensing element;
an analog-to-digital converter configured to convert the output signal to a digital signal,
wherein the power supply module is configured to switch between the plurality of operating modes to prevent transmission of the digital signal to the host device; and
a control module configured to, based on operation in one of the plurality of operating modes, transmit the parameter to the host device via the physical layer module,
wherein the network device is the first device, and
wherein the plurality of modules comprise the analog-to-digital converter and the control module.

11. The network device of claim 10, wherein the physical layer module is configured to:
forward the authentication request signal received from the host device to the power supply module or the control module;
transmit the authentication response signal from the network device to the host device; and
transfer the notification signal received from the host device to the power supply module or the control module.

12. The power supply module of claim 1, wherein the power supply module supplies power to only modules and circuit components in the first device.

13. The power supply module of claim 1, wherein the regulator module is configured to supply power from the power source to the plurality of modules in the first device and not to the host device.

14. The power supply module of claim 1, wherein the first device is a sensor, an actuator, or a radio frequency identification reader.

15. The power supply module of claim 1, wherein the power supply module does not supply power to the host device.

16. The power supply module of claim 1, wherein:
the authentication module is configured to
receive a request for information from the host device,
generate the information based on a physical quantity of the first device, and
transmit a response signal indicating the information to the host device; and
the notification signal is based on the information.

17. The power supply module of claim 16, wherein the physical quantity is a parameter detected by a sensor of the first device.

18. A system comprising:
the power supply module of claim 16;
the first device, wherein the first device comprises a sensor, and wherein the sensor is configured to generate the physical quantity; and
the host device,
wherein the host device is configured to
receive the physical quantity from the first device, and
generate the notification signal based on a comparison between the physical quantity and a reference value.

19. The power supply module of claim 1, wherein the regulator module is configured to transition to a sleep mode if the notification signal indicates that the power supply module is not authorized for operation in the first device.

20. The power supply module of claim 1, wherein:
the generation module is configured to (i) receive, via a physical layer module of the first device, the authentication request signal, (ii) transmit the authentication response signal to the host device via the physical layer module, and (iii) receive, via the physical layer module, the notification signal from the host device; and
the power supply module is separate from the physical layer module.

21. The network device of claim 10, wherein:
the power supply module is implemented as a system on chip; and
the power supply module is separate from the physical layer module.

22. The network device of claim 10, wherein the physical layer module, the sensing element, the analog-to-digital converter, and the control module receive power from the power supply module.

23. A host device comprising:
a plurality of line cards configured to route a plurality of signals to and from a plurality of network devices;

a gateway module configured to transfer the plurality of signals between the plurality of line cards and the plurality of network devices, wherein the plurality of network devices are separate from the host device; and a first security module configured to
generate authentication request signals,
transmit the authentication request signals from the host device to a plurality of power supply modules respectively in the plurality of network devices,
in response to the authentication request signals, receive authentication response signals from the plurality of power supply modules, wherein each of the authentication response signals include at least one of password, a key, a device identifier, a digital signature or an identification pin, and
based on the authentication response signals, transmit a plurality of notification signals from the host device to the plurality of power supply modules, wherein each of the plurality of notification signals is indicative of whether a corresponding one of the plurality of power supply modules is authorized for operation in the respective one of the plurality of network devices based on the at least one of the password, the key, the device identifier, the digital signature, or the identification pin in the corresponding one of the authentication response signals.

24. The host device of claim 23, wherein:
the security module is configured to, based on the authentication response signals, perform a countermeasure if one or more of the plurality of network devices is unauthorized; and
the countermeasure includes commanding the one or more of the plurality of network devices that are unauthorized to transition (i) from an ON-mode to a standby mode, (ii) from the ON-mode to an OFF-mode, or (iii) from the standby mode to the OFF-mode.

25. The host device of claim 23, wherein:
the authentication response signals include respective passwords; and
the notification signals are indicative, based on the passwords, of whether the plurality of power supply modules are authorized modules.

26. The host device of claim 23, wherein:
the authentication response signals include respective keys; and
the notification signals are indicative, based on the keys, of whether the plurality of power supply modules are authorized modules.

27. The host device of claim 23, wherein:
the authentication response signals include respective identifiers of
the plurality of power supply modules,
memories in authentication modules respectively of the plurality of power supply modules, or
control modules in the plurality of network devices, and
the notification signals are indicative, based on the respective identifiers, of whether the plurality of power supply modules are authorized modules.

28. The host device of claim 23, wherein:
the authentication response signals comprise respective passwords, respective identifiers, and a respective plurality of keys;
the respective identifiers identify (i) the plurality of power supply modules, (ii) memories in authentication modules of the plurality of power supply modules, or (iii) control modules in the plurality of network devices; and
the notification signal is indicative, based on the respective passwords, the respective identifiers, and the respective plurality of keys of the authentication response signals, of whether the plurality of power supply modules are authorized modules.

29. The host device of claim 23, wherein the gateway module comprises the security module.

30. The host device of claim 23, wherein:
the plurality of line cards comprises a first line card and a second line card;
the first line card comprises the first security module; and
the second line card comprises a second security module, wherein the second security module is configured to determine whether one or more of the plurality of power supply modules is an authorized module.

31. A system comprising:
the host device of claim 23; and
the plurality of network devices comprising the plurality of power supply modules.

32. The host device of claim 23, wherein each of the plurality of notification signals indicates whether a corresponding one of the plurality of power supply modules is authorized for operation in a respective one of the plurality of network devices.

33. The host device of claim 23, wherein the plurality of notification signals indicate whether the plurality of power supply modules are authorized for operation respectively in the plurality of network devices.

* * * * *